United States Patent Office 3,438,902
Patented Apr. 15, 1969

3,438,902
ORGANIC PHOSPHORUS COMPOUNDS
Riyad R. Irani, St. Louis, and Kurt Moedritzer, Webster Groves, Mo., assignors to Monsanto Company, St. Louis, Mo., a corporation of Delaware
No Drawing. Continuation-in-part of application Ser. No. 483,339, Aug. 27, 1965. This application Feb. 3, 1967, Ser. No. 613,724
Int. Cl. C11d 1/34
U.S. Cl. 252—153                    5 Claims

ABSTRACT OF THE DISCLOSURE

A dry cleaning composition is described containing a volatile, organic solvent of the dry cleaning type, such as Stoddard's solvent, naphtha, benzene, carbon tetrachloride, trichloroethylene and perchloroethylene, and an ester of an organo-amino-di-alkylenephosphonic acid which includes an ester of a long chain hydrocarbyl-amino-di-lower alkylene phosphonic acid such as tetraethyl tetradecyl-amino-di-methylphosphonate, tetraethyl dodecyl-amino-di-methylphosphonate and the like.

---

This invention relates to organic compounds of phosphorus.

This application is a continuation-in-part of applications Ser. No. 241,562, filed Dec. 3, 1962 now U.S. Patent No. 3,257,479 and Ser. No. 483,339, filed Aug. 27, 1965 now U.S. Patent No. 3,344,077.

An object of this invention is to provide new and useful organic compounds of phosphorus containing a

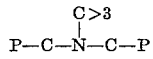

linkage in their molecules.

A further object of this invention is to provide new and useful organic compounds of phosphorus containing a

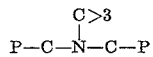

linkage in their molecules with the C>3 group being a hydrophobic and/or lipophilic group.

A further object of this invention is to provide new and useful organo phosphonic acids, as well as their salts and esters.

A more specific object of this invention is to provide new and useful organo-amino-di-alkylene phosphonate esters which exhibit, among other things, the unique ability of solubilizing water in water-immiscible solvents.

Other objects of this invention will appear from the description hereinafter.

This invention is directed to new and useful organo-amino-di-alkylene phosphonic acid compounds, as well as the salts and esters thereof, said compounds having the general formula

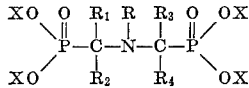

wherein R is selected from the class consisting of aliphatic hydrocarbyl, alicyclic, aryl, alkaryl and aralkyl groups of from 4 to 30 carbon atoms; $R_1$, $R_2$, $R_3$ and $R_4$ are selected from the class consisting of hydrogen, aliphatic hydrocarbyl, alicyclic, aryl, alkaryl and aralkyl groups of from 1 to 30 carbon atoms; and X is selected from the class consisting of cations and alkyl groups of from 1 to 20 carbon atoms. By the term "cations" is meant hydrogen ions, alkali metal cations, alkaline earth metal cations, ammonium ions, or amine ions. For the above-mentioned groups which represent R, $R_1$, $R_2$, $R_3$, $R_4$ and X when it represents an alkyl group, the OH, COOH, $OCH_3$, halogen, $NO_2$ and $SO_3$ substituted derivatives of the groups are intended to be also included within their meaning. However, for most end use applications the compounds of the instant invention should preferably contain not more than 25 carbon atoms associated with R, $R_1$, $R_2$, $R_3$, $R_4$ and X when it represents an alkyl group, and there are few, if any, end uses, in which the foregoing groups contain more than a total of 50 carbon atoms.

These compounds can be characterized quite generally as having a P—C—N—C—P linkage in their molecules and are generically described in this specification by the general terms organo-amino-di-alkylene-phosphonic acids, the salts of organo-amino-di-alkylenephosphonic acids, and the esters of organo-amino-di-alkylenephosphonic acid.

The compounds of the invention can be prepared by various methods with the following methods presented as being representative for their preparation.

The organo-amino-di-alkylenephosphonic acids can be prepared by the reaction of primary amines, a compound containing a carbonyl group, such as an aldehyde or ketone, and orthophosphorous acid. Generally, by heating the mixture above 50° C. at a low pH, preferably around pH 2 or below, the extent of the reaction is usually completed in one to three hours. Another method is the hydrolysis of the ester, i.e., tetra-alkyl organo-amino-di-alkylenephosphonate, with concentrated HCl or HBr. Generally by refluxing the ester and acid at reflux temperature for a period usually at least about three hours is all that is required for the hydrolysis. In the foregoing reactions molar ratios should be used in the proportions which will form the desired P—C—N—C—P molecular linkage.

The salts or organo-amino-di-alkylene phosphonic acids can be prepared by neutralization of the acids with a stoichiometric amount of a base that contains essentially the desired cation. Bases such as those containing an alkali metal, alkaline earth, ammonia and amines are especially suited. In particular, amine salts prepared from low molecular weight amines, i.e., having a molecular weight below about 300, and more particularly the alkyl amines, alkylene amines and alkanol amines containing not more than 2 amine groups, such as, ethyl amine, diethyl amine, propylamine, propylene diamine, hexylamine, 2-ethyl hexyl amine, N-butylethanol amine, ethanol amine, triethanol amine and the like, are the preferred amine salts. For example, to make a sodium salt, one of the organo-amino-di-alkylene phosphonic acids can be neutralized with a stoichiometric amount of a base containing the sodium cation, such as NaOH, $Ca_2CO_3$ and the like.

The esters of organo-amino-di-alkylene phosphonic acids can be prepared directly by the reaction of primary amines, a compound containing a carbonyl group, such as an aldehyde or ketone, and a dialkyl phosphonate. Generally by heating the mixture above 50° C. the extent of the reaction is usually completed in about one to three hours. In some cases it is advantageous to form a reaction product of an aldimine or ketimine with a dialkyl phosphonate and still further react the product with a mixture of an adehyde or ketone and dialkyl phosphonate. This method can result in forming a C-substituted P—C—N—C—P molecular linkage. It should be noted that here also it is necessary to use the correct molar ratios in order to obtain satisfactory yields with the desired P—C—N—C—P molecular linkage.

For the foregoing methods of preparation reaction conditions such as temperature, pH, and time for reaction can be varied with the optimum conditions for the reactions readily ascertained by those skilled in the art. Reference to the specific examples presented hereinafter may be of aid in order to further assist in teaching the methods of their preparation.

The following examples are presented to illustrate the invention, with parts by weight being used in the examples unless indicated otherwise.

Example I

Into a conventional jacketed, glass-lined mixing vessel fitted with a water condenser are charged 164 parts of orthophosphorous acid, 102 parts of n-hexylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then, for an additional hour after all of the formaldehyde has been added, the resulting mixture is refluxed at a temperature of about 110° C. after which time the reaction mixture is cooled to room temperature. By nuclear magnetic resonance measurements, it is found that more than 90% of the orthophosphorous acid has been converted to the desired product, hexylaminodi(methylphosphonic acid), $C_6H_{13}N(CH_2PO(OH)_2)_2$. The equivalent weight of this product, by titration, is found to be about 96.1, which compares excellently with the calculated value of about 96.3.

Example II

Into a mixing vessel similar to that described in Example I, above, are charged 134 parts of cyclohexylamine hydrochloride, 164 parts of orthophosphorus acid and 25 parts of water. The resulting mixture is blended together and heated to 100° C. Then, over a period of about 30 minutes, 66 parts (10% excess) of paraformaldehyde are added slowly thereinto. Then for an additional hour after all of the formaldehyde has been added the resulting mixture is refluxed at a temperature of about 110° C. after which the reaction mixture is cooled to room temperature. By nuclear magnetic resonance measurements, it is found that more than 90% of the orthophosphorous acid has been converted to the desired product, cyclohexylaminodi(methylphosphonic acid), $$C_6H_{11}N(CH_2PO(OH)_2)_2.$$

The equivalent weight of this product, by titration, is found to be about 96.6, which compares excellently with the calculated value of about 95.7.

Example III

Into a mixing vessel such as that described in Example I, above, are charged 164 parts of orthophosphorous acid, 213 parts of n-tetradecylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then for an additional hour after all the formaldehyde has been added, the resulting mixture is refluxed at a temperature of about 110° C. after which the reaction mixture is cooled to room temperature. By nuclear magnetic resonance measurements, it is found that more than 90% of the orthophosphorous acid has been converted to the desired product, n-tetradecylamino-di(methylphosphonic acid), $C_{14}H_{29}N(CH_2PO(OH)_2)_2$. The equivalent weight of this product, by titration, is found to be about 137, which compares excellently with the calculated value of about 134.

Example IV

Trisodium n - tetradecylaminodi(methylphosphonate), $C_{14}H_{29}N[CH_2PO(ONa)_2][CH_2PO(ONa)(OH)]$, is prepared by dissolving 20 grams of free acid obtained in Example III in about 50 ml. of 10% NaOH solution and evaporating the aqueous solution to dryness at about 140° C. with the anhydrous form of the salt being formed.

Example V

Into a mixing vessel similar to that described in Example I, above, are charged 164 parts of orthophosphorous acid, 266 parts of oleylamine, and 50 parts of water. The resulting mixture is stirred continuously through the remainder of the process described below. The mixture is heated to 95° C., and maintained at about 95° C. while, over a period of about 20 minutes, 66 parts (10% excess) of paraformaldehyde are added slowly thereinto. Then for an additional hour after all formaldehyde has been added, the resulting mixture is refluxed at a temperature of about 110° C. after which the reaction mixture is cooled to room temperature. By nuclear magnetic resonance measurements, it is found that more than 90% of the orthophosphorous acid has been converted to the desired product, oleylaminodi(methylphosphonic acid), n-$C_{18}H_{35}N(CH_2PO(OH)_2)_2$. The equivalent weight of this product, by titration, is found to be about 158.2, which compares excellently with the calculated value of about 152.5.

Example VI

Into a mixing vessel similar to that described in Example I, above, are charged 134 parts of cyclohexylamine hydrochloride, 164 parts of orthophosphorous acid, and 25 parts of water. The resulting mixture is blended together and heated to 100° C. Then, over a period of about 30 minutes, 215 parts of benzaldehyde are slowly poured into the hot mixture. The temperature of the reaction mixture is maintained at about 100° C. for 2 hours, and then cooled to room temperature. Nuclear magnetic resonance analysis of the resulting product indicates that practically all of the orthophosphorous acid has been reacted to form the desired stable P—C—N—C—P linkage. The equivalent weight of the resulting product, cyclohexylaminodi(benzylidenephosphonic acid), $$C_6H_{11}N(CH(C_6H_5)PO(OH)_2)_2$$

is 114 (theory=109).

Example VII

Into a mixing vessel similar to that described in Example I, above, are charged 164 parts of orthophosphorous acid, 108 parts of benzylamine and 75.6 parts of concentrated HCl. The resulting mixture is stirred and heated at 90–100° C. while 120 parts of 37% aqueous formaldehyde solution (100% excess) are added in the course of 30–60 minutes. The solution is then kept at 90–100° C. for about 2 to 3 hours. On cooling to room temperature benzylaminodi(methylphosphonic acid), $$C_6H_5CH_2N(CH_2PO(OH)_2)_2$$

precipitates with a yield of 85.7%. The equivalent weight of this product, by titration, is found to be about 102 which compares with the calculated value of about 98.4.

Example VIII

Into a conventional mixing vessel fitted with a reflux condenser are blended 119 parts of α-hydroxy-decylphosphonic acid and 58 parts of decylamine. The mixture is heated at about 110° C. for about 3 hours. The resulting product, decylaminodi(nonylmethylphosphonic), $$C_{10}H_{21}N[CH(C_9H_{19})PO(OH)_2]_2$$

precipitated in the form of its tri(decylammonium) salt upon cooling. The free acid is generated by prolonged grinding of the product in 5 N HCl followed by dilution of boiling water.

Example IX

Into a conventional 3-necked, 3-liter flask fitted with a reflux condenser, stirrer and thermometer are charged 102 parts of n-hexylamine, 246 parts of diethyl phosphonate and 180 parts of paraformaldehyde. Upon heating to 70°

C. a vigorous reaction is initiated forming the product tetraethyl hexylaminodi(methylphosphonate), $$C_6H_{13}N(CH_2PO(OC_2H_5)_2)_2$$

The N.M.R. spectrum of the product indicates almost complete conversion (≥98%) of the originally present diethylphosphonate to the tetraethyl hexylaminodi(methylphosphonate) by exhibiting a single N.M.R peak at −24.9 p.p.m.

Example X

Into a conventional 3-necked, 3-liter flask fitted with a reflux condenser, stirrer and thermometer were charged 426 parts of tetradecylamine, 485 parts of diethyl phosphonate and 325 parts of 36% aqueous formaldehyde solution. The mixture is heated to about 70° C. at which temperature the reaction becomes exothermic with the temperature rising to about 120° C. The flask is allowed to cool to room temperature and the reaction product extracted with benzene. The solvent was separated from the oily product by distillation. This product, tetraethyl tetradecylaminodi(methylphosphonate), $$C_{14}H_{29}N(CH_2P(O)_3C_2H_5)_2$$

had a N.M.R. chemical shift of −24.9 p.p.m. The single N.M.R. peak of the product indicates the presence of only one type of phosphorus compound, i.e., tetraethyl tetradecyl aminodi(methylphosphonate).

Example XI

A ketimine is prepared from 182 parts of n-hexylamine and 105 parts of acetone by reacting the acetone with the primary amine in the presence of anhydrous potassium carbonate, separating the ketimine from the aqueous layer and drying thoroughly over potassium hydroxide. This procedure resulted in 231 parts of the ketimine.

Into a reaction vessel similar to that described in Example X are charged the 231 parts of the ketimine and 226 parts of diethyl phosphonate. The mixture is heated to 50° C. at which temperature the reaction is initiated as indicated by the rise in temperature to about 120° C. After cooling to room temperature the resulting product is treated with 50 parts of paraformaldehyde and 225 parts of diethyl phosphonate. This mixture is heated under stirring to about 90° C. at which temperature a vigorous reaction takes place as indicated by the dissolution of the solid paraformaldehyde and an increase of the temperature to 110° C. The resulting product is tetraethyl n-hexyl amino(isopropylidene phosphonate) (methyl phosphonate, $$C_6H_{13}N[C(CH_3)_2PO(OC_2H_5)_2][CH_2PO(OC_2H_5)_2]$$

Example XII

An imine is prepared by reacting 144 parts of butyraldehyde with 214 parts of benzylamine in the presence of anhydrous potassium carbonate, separating the imine product from the aqueous layer and drying over potassium hydroxide. This procedure resulted in a quantity of 308 parts of the imine.

Into a reaction vessel similar to that described in Example X are charged 260 parts of diethyl phosphonate and the 308 parts of imine. The mixture is heated to about 50° C. to initiate the reaction. After cooling to room temperature the resulting product is further reacted with 60 parts of paraformaldehyde and 260 parts of diethyl phosphonate by heating to about 90° C. under stirring, at which temperature a vigorous reaction occurs with the desired product, tetraethyl benzylamino(butylidene phosphonate) (methyl phosphonate), $$C_6H_5CH_2N[CH(C_3H_7)PO(OC_2H_5)_2][CH_2PO(OC_2H_5)_2]$$

being formed.

Compounds representative of the instant invention which can be prepared by methods such as those described in the foregoing examples are:

(1) Long chain aliphatic hydrocarbyl-amino-di-alkylene phosphorus compounds, such as $C_4H_9N(CH_2P(O)(OH)_2)_2$—n-butyl-amino-di(methyl phosphonic acid)
$C_{10}H_{21}N(CH_2PO(OC_2H_5)_2)_2$—tetraethyl-decyl-amino-di(methyl phosphonate)
$C_{15}H_{31}N[CH_2PO(ONa)(OH)][CH_2PO(ONa)_2]$—trisodium-pentadecyl-amino-di(methyl phosphonate)
$C_5H_7N(CH_2PO(OH)_2)_2$—3,5-pentadiene-amino-di(methyl phosphonic acid)
$C_5H_9N(CH_2PO(OH)_2)_2$—5-hexyne-amino-di(methyl phosphonic acid)
$C_9H_{15}N(CH_2PO(OC_2H_5)_2)_2$—tetraethyl-8-nonyne amino-di(methyl phosphonate)
$C_{12}H_{21}N(CH_2PO(OH)_2)_2$—11-dodecene-amino-di(methyl phosphonic acid)
$(HOOC)C_3H_6N(CH_2PO(OH)_2)_2$—3-carboxy-propyl-amino-di(methyl phosphonic acid)
$OHC_{12}H_{24}N(CH_2PO(OC_2H_5)_2)_2$—tetraethyl-12-hydroxyl-dodecane-amino-di(methyl phosphonate)
$C_5H_9N(CH_2PO(OH)_2)_2$—5-pentene-amino-di-(methyl phosphonic acid)
$C_4H_9N(C(C_6H_5)HP(O)(OH)_2)_2$—n-butyl-amino-di(benzylidene phosphonic acid)
$(OH)C_{12}H_{24}N(C(C_9H_{19})HP(O)(OH)_2)_2$—12-hydroxy-dodecane-amino-di(nonyl methyl phosphonic acid)
$C_{12}H_{25}N[C(CH_3)_2PO(OH)_2][CH_2PO(OH)_2]$—dodecyl-amino(isopropylidene phosphonic acid)-(methyl phosphonic acid)
$C_{10}H_{21}N[C(C_6H_{11})HPO(OH)_2][CH_2PO(OH)_2]$—decyl-amino(cyclohexyl methyl phosphonic acid) (methyl phosphonic acid)
$C_{12}H_{25}N[C(C_{10}H_7)HPO(OH)_2][CH_2PO(OH)_2]$—dodecyl-amino (1-naphthyl methyl phosphonic acid) (methyl phosphonic acid)
$nC_4H_9N(CH_2P(O)(O_2Ca)_2)_2$—dicalcium-n-butyl-amino-di(methyl phosphonate)
$C_{12}H_{25}N[CH_2PO(ON(CH_3)_4)_4][CH_2PO(ON(CH_3)_4)(OH)]$—tri-tetramethyl ammonium-dodecyl-amino-di(methyl phosphonate)
$C_{12}H_{25}N[CH_2PO(O·NH_3CH_2CH_2OH)_2][CH_2PO(O·NH_3CH_2CH_2OH)(OH)]$—tri-ethanol ammonium-dodecyl-amino-di(methyl phosphonate)
$C_{14}H_{29}N[CH_2PO(ONH_4)_2][CH_2PO(ONH_4)(OH)]$—tri-ammonium tetradecyl-amino-di(methyl phosphonate)
$C_6H_{13}N(CH_2PO(OCH_2C_6H_5)_2)_2$—tetrabenzyl-n-hexyl-amino-di(methyl phosphonate)
$C_6H_{13}N(CH_2PO(OCH_2CH_2C_6H_5)_2)_2$—tetraphenylethyl-n-hexyl-amino-di(methyl phosphonate)

(2) Monocyclic, alicyclic-amino-di-alkylene phosphorus compounds, such as $C_4H_7N(CH_2PO(OH)_2)_2$—cyclobutyl-amino-di(methyl phosphonic acid)
$OHC_6H_{10}N(CH_2PO)OH)_2)_2$—2-hydroxy-cyclohexyl-amino-di(methyl phosphonic acid)
$C_5H_9N(CH_2PO(OH)_2)_2$—cyclopentyl-amino-di(methyl phosphonic acid)
$C_5H_9N(C(CH_3)_2PO(OH)_2)_2$—cyclopentyl-amino-di(isopropylidene phosphonic acid)
$C_6H_{11}N(CH_2PO(OC_6H_5)_2)_2$—tetraphenyl-cyclohexyl-amino-di(methyl phosphonate)

(3) Monocyclic, aryl - amino - di - alkylene phosphorus compounds, such as $C_6H_5N(CH_2PO(OH)_2)_2$—phenyl-amino-di(methyl phosphonic acid)
$C_6H_5N[C(CH_3)_2PO(OH)_2][CH_2PO(OH)_2]$—phenyl-amino(isopropylidene phosphonic acid) (methyl phosphonic acid)

$(NO_2)_2C_6H_3N(CH_2PO(OH)_2)_2$—2,4-dinitro-phenyl-amino-di(methyl phosphonic acid)

$COOH(C_6H_4)N(CH_2PO(OH)_2)_2$—4-carboxy-phenyl-amino-di(methyl phosphonic acid)

$(Cl)_2(OH)C_6H_2N(CH_2PO(OH)_2)_2$—3,5-dichloro-6-hydroxy-phenyl-amino-di(methyl phosphonic acid)

$(OH)C_6H_4N(CH_2PO(OH)_2)_2$—4-hydroxy-phenyl-amino-di(methyl phosphonic acid)

$(NO_2)(OCH_3)C_6H_3N(CH_2PO(OH)_2)_2$—3-nitro-4-methoxy-phenyl-amino-di(methyl phosphonic acid)

$C_6H_5N(CH_2PO(OC_6H_{11})_2)_2$—tetrahexyl-phenyl-amino-di(methyl phosphonate)

$C_6H_5N(CH_2PO(OC_{12}H_{23})_2)_2$—tetra-11-dodecene-phenyl-amino-di(methyl phosphonate)

(4) Dicyclic, aryl-amino-di-alkylene phosphorus compounds, such as $Cl(C_6H_4)(C_6H_4)N(CH_2PO(OH)_2)_2$—4'-chloro-4-N-diphenyl-amino-di(methyl phosphonic acid)

$(OH)C_{10}H_6N(CH_2PO(OH)_2)_2$—4-hydroxy-naphthyl-1-amino-di(methyl phosphonic acid)

$(OH)(SO_3H)C_{10}H_5N(CH_2PO(OH)_2)_2$—1-sulfo-3-hydroxy-naphthyl-1-amino-di(methyl phosphonic acid)

(5) Monocyclic, alkaryl-amino-di-alkylene phosphorus compounds, such as $(CH_3)C_6H_4N(CH_2PO(OH)_2)_2$—p-methyl-phenyl-amino-di(methyl phosphonic acid)

$(CH_3)_2C_6H_3N(CH_2PO(OH)_2)_2$—xylyl-amino-di(methyl phosphonic acid)

$(CH_3)C_6H_4N(CH_2PO(OC_2H_5)_2)_2$—tetra ethyl p-methyl-phenyl-amino-di(methyl phosphonate)

$(CH_3)_2C_6H_3N(CH_2PO(ONa)_2)[CH_2PO(ONa)(OH)]$—trisodium xylyl-amino-di(methyl phosphonate)

$C_{12}H(C_6H_4)N(CH_2PO(OH)_2)_2$—dodecyl-phenyl-amino-di(methyl phosphonic acid)

$(CH_3)_4C_6HN(CH_2PO(OH)_2)_2$—durylene-amino-di(methyl phosphonic acid)

(6) Dicyclic, alkaryl - amino - di - alkylene phosphorus compounds, such as $(CH_3)C_{10}H_7N(CH_2PO(OH)_2)_2$—5-methyl-naphthyl-2-amino-di(methyl phosphonic acid)

$(CH_3)(OH)C_{10}H_6N(CH_2PO(OH)_2)_2$—2-methyl-1-hydroxy-4-naphthyl-amino-di(methyl phosphonic acid)

$(C_{12}H)C_{10}H_6N(CH_2PO(OH)_2)_2$—7'-dodecyl-naphthyl-2-amino-di(methyl phosphonic acid)

(7) Monocyclic, aralkyl-amino-di-alkylene phosphorus compounds, such as $C_6H_5CH_2CH_2N(CH_2PO(OH)_2)_2$—phenylethyl-amino-di(methyl phosphonic acid)

$C_6H_5CH_2CH_2CH_2N(CH_2PO(OH)_2)_2$—phenylpropyl-amino-di(methyl phosphonic acid)

$C_6H_5CH_2N[C(C_5NH_4)HPO(OH)_2][CH_2PO(OH_2)]$—phenylmethyl-amino(2-pyridyl methyl phosphonic acid) (methyl phosphonic acid)

$C_6H_5CH_2CH_2N(CH_2PO(O_2Ca)_2)$—dicalcium-phenyl-ethyl-amino-di(methyl phosphonate)

The esters of organo-amino-di-alkylene phosphonic acids were found not only to be completely miscible with water but also highly soluble in organic solvents, such as hydrocarbon solvent, i.e., hexane and pentane, carbon tetra chloride, haloethylene solvents, i.e., perchloroethylene, ethers, alcohols, and the like. Also, the esters were found to impart a solubilizing action to water in water-immiscible solvents, such as many of the previously mentioned solvents. This totally unexpected property renders them highly useful as gasoline de-icer additives and along with their surfactancy properties renders them useful as dry cleaning detergents. As can be appreciated, however, the unique ability to impart a solubilizing action to water in water-immiscible solvents can be utilized in many and varied applications and therefore, the foregoing mentioned applications are merely indicative of their use.

The esters of long chain hydrocarbyl-amino-di-lower alkylene phosphonic acids are preferred in applications which use the combined surfactancy and/or water solubilizing properties. These compounds are of the following formula:

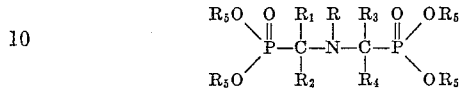

wherein R is selected from the class consisting of saturated and ethylenically unsaturated aliphatic hydrocarbyl radicals containing from 4 to 20 carbon atoms; $R_1$, $R_2$, $R_3$ and $R_4$ are selected from the group consisting of hydrogen and lower alkyl groups (1 to 4 carbon atoms); and $R_5$ is an alkyl group of from 1 to 6 carbon atoms.

Because of the complexity of the ternary solubility diagram of the esters of the instant invention—water—water immiscible solvents, the following is set forth for example purposes only.

(A) A solution of equal volumes of tetraethyl tetradecylamino-di-methylphosphonate,

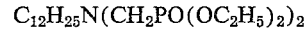

and water were found to completely dissolve one volume of hexane.

(B) A solution of equal volumes of tetraethyl iso-butyl amino-di-methylphosphonate, iso-

and water were found to completely dissolve one-half a volume of hexane.

(C) A solution of 50 cc. of hexane and 3 grams of the following esters of the long chain alkylamino-di-methylphosphonic acids dissolved the amounts of water at room temperature indicated in Table 1. The water was added dropwise until permanent cloudiness of phase separation was observed. The tabulated results are presented in the following table.

TABLE 1

Compound: H₂O added (grams)

(1) tetraethyl hexadecylamino - di - methylphosphonate—$C_{16}H_{33}N(CH_2PO(OC_2H_5)_2)_2$ ---------- 3
(2) tetraethyl tetradecyl amino - di - methylphosphonate—$C_{12}H_{25}N(CH_2PO(OC_2H_5)_2)_2$ ---------- 1
(3) tetraethyl, octylamino - di - methylphosphonate—$C_8H_{17}N(CH_2PO(OC_2H_5)_2)_2$ ---------- .7
(4) tetraethyl iso-butyl amino-di-methylphosphonate—iso-$C_4H_9N(CH_2PO(OC_2H_5)_2)_2$ ----- several drops It should be noted that the foregoing example solutions exhibited no phase separation at the end of a one-week period of standing nor was there a phase separation after the solutions had been centrifuged at 5,000 r.p.m. for one hour indicating that the water was completely dissolved in the water-immiscible solvent. It should further be noted that tetraethyl methyl amino-di-methylphosphonate, $CH_3N(CH_2PO(OC_2H_5)_2)_2$, did not impart a solubilizing action to water in a water-immiscible solvent.

As dry cleaning additives the ester compounds of the instant invention can be used as either the primary surfacant or in conjunction with other surfactants. When used as substantially the primary surfactant with many of the common volatile organic solvents of the dry cleaning type, such as, Stoddard's solvent (petroleum distillate), naphtha, benzene, carbon tetrachloride, trichloroethylene and perchloroethylene, amounts within the range of .05% to 4% by weight are usually sufficient with amounts of from about 1 to 2% by weight being preferred.

The following formulations in which percentages are by weight are presented as being illustrative of the present invention:

Example XIII

A mixture of the following is prepared which gives satisfactory results in dry-cleaning:

| | Percent |
|---|---|
| Perchloroethylene | 96 |
| Tetraethyl tetradecyl amino-di-methyl phosphonate | 4 |

Example XIV

A mixture of the following is prepared which gives satisfactory results in dry-cleaning:

| | Percent |
|---|---|
| Stoddard's solvent | 99 |
| Tetraethyl dodecyl amino-di-methylphosphonate | 1 |

What is claimed is:

1. A dry cleaning composition comprising from about 96% to 99.95% by weight of an organic dry cleaning solvent selected from the group consisting of Stoddard's solvent, naphtha, benzene, carbon tetrachloride, trichloroethylene and perchloroethylene and from about 0.05% to 4% by weight of an ester of an organo-amino-di-alkylene phosphonic acid, said ester having the formula:

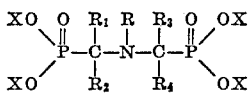

wherein R is selected from the class consisting of aliphatic hydrocarbyl groups containing from 4 to 30 carbon atoms, alicyclic groups containing from 4 to 6 carbon atoms, aryl groups containing from 6 to 10 carbon atoms, alkaryl groups containing from 7 to 30 carbon atoms and aralkyl groups containing from 7 to 30 carbon atoms; $R_1$, $R_2$, $R_3$ and $R_4$ are selected from the class consisting of hydrogen aliphatic hydrocarbyl groups containing from 1 to 30 carbon atoms, alicyclic groups containing from 4 to 6 carbon atoms, aryl groups containing from 6 to 10 carbon atoms, alkaryl groups containing from 7 to 30 carbon atoms and aralkyl groups containing from 7 to 30 carbon atoms; and X is an alkyl group containing from 1 to 20 carbon atoms.

2. A dry cleaning composition according to claim 1, wherein said ester has the formula:

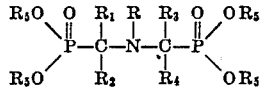

wherein R is selected from the class consisting of saturated and ethylenically unsaturated aliphatic hydrocarbyl radicals containing from 4 to 20 carbon atoms; $R_1$, $R_2$, $R_3$ and $R_4$ have the structure $C_xH_{2x}+1$ wherein $x$ is an integer from 0 to 4 inclusive; and $R_5$ is an alkyl group of from 1 to 6 carbon atoms.

3. A dry cleaning composition according to claim 2, wherein said solvent is present in an amount of from about 91% to 99% by weight and said ester compound is present in an amount of from about 1% to 2% by weight.

4. A dry cleaning composition according to claim 3, wherein said ester compound is tetraethyl tetradecyl-amino-di-methylphosphonate.

5. A dry cleaning composition according to claim 3, wherein said ester compound is tetraethyl dodecyl-amino-di-methylphosphonate.

References Cited

UNITED STATES PATENTS

| 3,257,479 | 6/1966 | Irani et al. | 260—932 |
| 3,269,812 | 8/1966 | Irani et al. | 44—72 |

FOREIGN PATENTS

| 540,976 | 5/1957 | Canada. | |

LEON D. ROSDOL, *Primary Examiner.*

B. BETTIS, *Assistant Examiner.*

U.S. Cl. X.R.

252—170